(12) United States Patent
Kahn et al.

(10) Patent No.: US 7,363,476 B2
(45) Date of Patent: *Apr. 22, 2008

(54) METHOD AND APPARATUS TO SUPPORT AN EXPANDED REGISTER SET

(75) Inventors: Opher D. Kahn, Zichron-Yacov (IL); Alexander Peleg, Haifa (IL); Bob Valentine, Kiriat Tivon (IL)

(73) Assignee: Intel Corporation, Santa Clara, CA (US)

( * ) Notice: Subject to any disclaimer, the term of this patent is extended or adjusted under 35 U.S.C. 154(b) by 465 days.

This patent is subject to a terminal disclaimer.

(21) Appl. No.: 10/625,240

(22) Filed: Jul. 22, 2003

(65) Prior Publication Data

US 2005/0114628 A1    May 26, 2005

Related U.S. Application Data

(63) Continuation of application No. 09/536,476, filed on Mar. 28, 2000, now Pat. No. 6,625,724.

(51) Int. Cl.
*G06F 9/30* (2006.01)
*G06F 12/06* (2006.01)

(52) U.S. Cl. .................. 712/229; 712/208; 712/209
(58) Field of Classification Search ............. 712/208, 712/209, 229
See application file for complete search history.

(56) References Cited

U.S. PATENT DOCUMENTS

| | | | |
|---|---|---|---|
| 5,446,912 A | 8/1995 | Colwell et al. | ............. 395/800 |
| 6,014,739 A | 1/2000 | Christie | ............. 712/228 |
| 6,157,996 A | 12/2000 | Christie | ............. 712/218 |
| 6,230,259 B1 | 5/2001 | Christie et al. | ............. 712/228 |

OTHER PUBLICATIONS

Pentium® Pro Family Developer's Manual; vol. 2: Programmer's Reference Manual , pp. 11-1-11.3, 1996.
Intel Architecture Software Developer's Manual; vol. 2: Instruction Set Reference, pp. 2-1-2-6, 1997.
Intel Architecture Software Developer's Manual; vol. 1: Basic Architecture, pp. 2-1-2-13, 1999.
Intel Architecture Software Developer's Manual; vol. 2: Instruction Set Reference, pp. B-19-B-34, 1999.
Chia-Lin Yang, Barton Sano, and Alvin S. Lebeck, "Exploiting Instruction Level Parallelism in Geometry Processing for Three Dimensional Graphics Applications", #0-8186-8609-X/98, pp. 14-24, 1998 IEEE.

*Primary Examiner*—David J. Huisman
(74) *Attorney, Agent, or Firm*—Kenyon & Kenyon LLP

(57) ABSTRACT

According to an embodiment of the present invention, a microprocessor includes an expanded logical register set that can be accessed by instructions including legacy opcodes and remapped addressing mode information. The known IA-32 instruction set is limited to accessing eight logical general integer registers. An IA-32 instruction can specify which of the eight logical general integer registers are to be accessed via 3-bit register identifier fields of the addressing mode information of the instruction. Each 3-bit register identifier can specify any of the eight logical general integer registers. An expanded logical register set (e.g., sixteen logical registers, thirty-two logical registers, sixty-four logical registers, etc.) can be accessed by remapping the addressing mode information to include at least four-bit register identifiers without defining new opcodes or defining additional instruction prefixes.

19 Claims, 4 Drawing Sheets

METHOD AND APPARATUS TO SUPPORT
AN EXPANDED REGISTER SET

CROSS REFERENCE TO RELATED APPLICATION

This application is a Continuation of U.S. patent application Ser. No. 09/536,476, issued as U.S. Pat. No. 6,625,724, filed on Mar. 28, 2000.

FIELD OF THE INVENTION

Embodiments of the present invention relate to microprocessors. More particularly, embodiments of the present invention relate to an expanded set of registers in a microprocessor.

BACKGROUND OF THE INVENTION

A known microprocessor architecture is the IA-32 architecture of Intel Corp. of Santa Clara, Calif. The IA-32 architecture includes 32-bit general integer registers. The general integer registers can be used as operands for calculations and for addressing. For example, a register can store a value that is part of an operation (e.g., an arithmetic operation, a logical operation, etc.). In another example, a register can store information relating to a memory address that stores a value that is part of an operation. The IA-32 architecture includes a small number of logical general integer registers, i.e., eight logical general integer registers. In general, fewer logical registers can disadvantageously affect system performance because software compilers can be limited in terms of optimizations that can be implemented. For example, fewer registers can require increased accesses to memory and/or stack, which can decrease system performance. In view of the foregoing, it can be appreciated that a substantial need exists for methods and apparatuses which can advantageously support an expanded logical register set.

DETAILED DESCRIPTION

According to an embodiment of the present invention, a microprocessor includes an expanded logical register set that can be accessed by instructions including legacy opcodes and remapped addressing mode information. The known IA-32 instruction set is limited to accessing eight logical general integer registers. An IA-32 instruction can specify which of the eight logical general integer registers are to be accessed via 3-bit register identifier fields of the addressing mode information of the instruction. Each 3-bit register identifier can specify any of the eight logical general integer registers. An expanded logical register set (e.g., sixteen logical registers, thirty-two logical registers, sixty-four logical registers, etc.) can be accessed by remapping the addressing mode information to include at least four-bit register identifiers without defining new opcodes or defining additional instruction prefixes.

Figure 1:
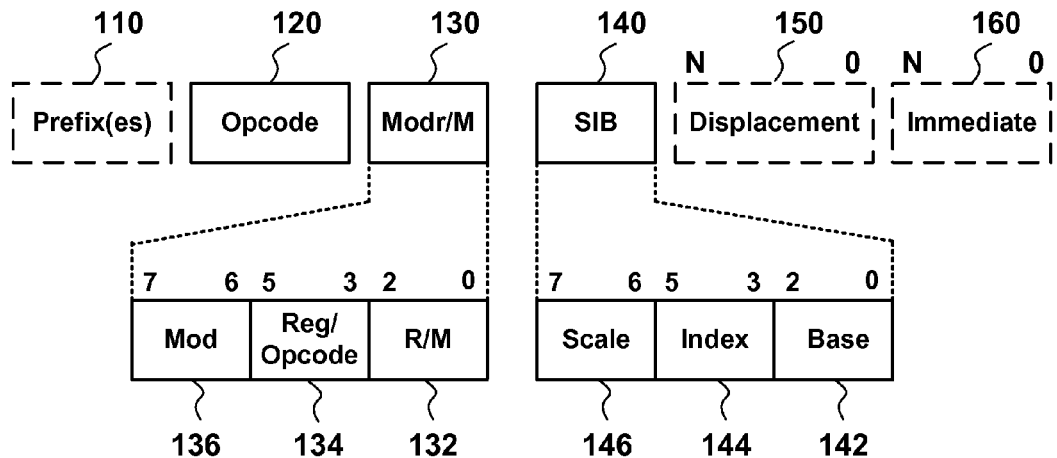
FIG. 1 shows an example of an instruction form of an IA-32 instruction.

FIG. 1 shows an example of a general instruction format of an IA-32 instruction. IA-32 instruction encodings can be subsets of the general instruction format shown in FIG. 1. An IA-32 instruction can include up to four optional prefix(es) 110, an opcode 120, a ModR/M byte 130, a SIB (scale index base) byte 140, an optional address displacement 150, and an optional immediate operand 160.

The optional prefix(es) 110 can include a byte, for example, that specifies that the instruction utilizes Streaming SIMD (single instruction multiple data) Extensions that can be executed, for example, by a Pentium® III processor manufactured by Intel Corp. The opcode 120 can include a primary opcode of one or two bytes.

ModR/M byte 130 and the SIB byte 140 can include addressing mode information. The ModR/M byte 130 can include a mod field 136, a reg/opcode field 134, and an r/m field 132. The mod field 136 can combine with the r/m field 132 to specify thirty-two values specifying eight registers and twenty-four addressing modes. The r/m field 132 can specify a register as an operand or can be combined with the mod field 136 to encode an addressing mode. The reg/opcode field 134 can include a register identifier to specify a register number or three additional bits of opcode information, and the reg/opcode field's purpose (e.g., a reg field, an opcode field, etc) can be specified within opcode 120. Encodings of the ModR/M byte 130 can require a second addressing mode information byte—the SIB byte 140—to specify the addressing mode of an instruction. For example, the SIB byte 140 can be required in certain 32-bit addressing forms of the IA-32 architecture, such as the base-plus-index addressing form, the scale-plus-index addressing form, etc. The SIB byte can include a scale field 146 to specify a scale factor, an index field 144 including a register identifier to specify a register number of an index register, and a base field 142 including a register identifier to specify a register number of a base register.

An IA-32 instruction can include a displacement 150 for certain addressing forms. When an addressing form includes a displacement 150, the displacement 150 can include a plurality of bytes, e.g., one byte, two bytes, four bytes, etc. An IA-32 can also include an immediate operand 160, which can follow any displacement 150. The immediate operand 160 can include one byte, two bytes, four bytes, etc. The optional immediate operand 160, when present, can include n bits (e.g., eight bits, sixteen bits, thirty-two bits, etc.).

Figure 2:
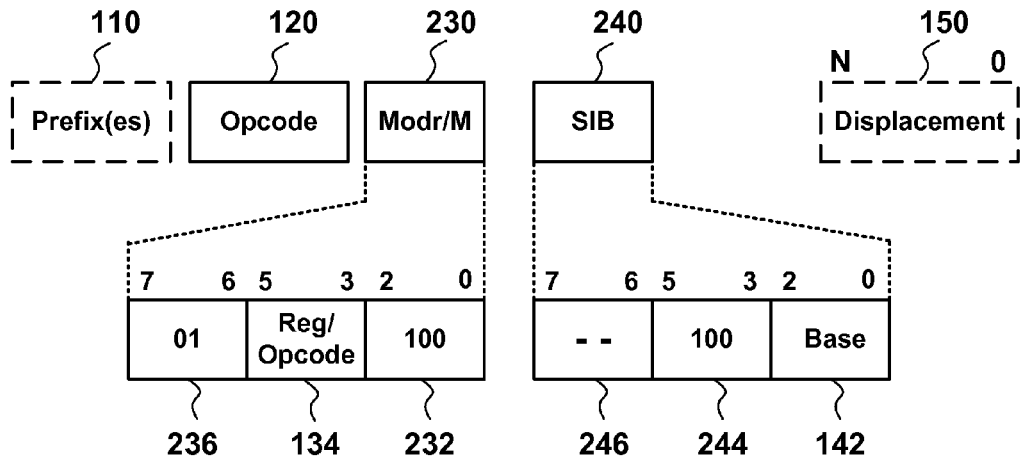
FIG. 2 shows an example of an instruction form of an IA-32 instruction.

FIG. 2 shows an example of a particular instruction format of an IA-32 instruction. Instruction 200 includes a ModR/M byte 230 with a mod field 236 having a value of 01B ("01B" encompasses a binary value of 01) and an r/m field 232 having a value of 100B. A SIB byte 240 of instruction 200 includes an index field 244 having a value of 100B. The reg/opcode field 134 includes three bits (bits 3 through 5 of ModR/M byte 230) that can specify one of eight logical general integer registers, and base field 142 includes three bits (bits 0 through 2 of SIB byte 240) that can specify one of eight logical general integer registers. An instruction having the format of instruction 200—where the mode field 236 is 01B, the R/M field 232 is 100B, the index field is 100B—has addressing mode information that is currently unsupported in the IA-32 architecture regardless of the value of the scale field 246.

An instruction of the format of instruction 200 thereby includes heretofore unused bit fields (e.g., the two bits of scale field 246, bits of displacement 150, etc.), that can support an expanded logical register set for existing instructions formats and legacy operands. The expanded logical register set can encompass an expanded logical general integer register set, an expanded logical MMX® technology register set, an extended logical SIMD floating-point register, etc. An expanded logical register set can be advantageous by allowing software compilers to increase the amount of optimizations and reduce the number of accesses to memory and/or stack, which can increase system performance.

Known revisions to the IA-32 architecture have added registers in addition to the eight 32-bit general integer registers. Such additional registers, however, cannot be accessed by legacy opcodes of instructions (e.g., opcodes supported by the pre-revision architecture) without extension of the instruction. For example, a known revision to the IA-32 architecture includes support for an additional set of instructions, i.e., MMX® instructions (MMX® is a registered trademark of Intel Corp.). The MMX® instructions can access a set of eight 64-bit registers—the eight logical MMX® technology registers—but such access was provided by defining additional opcodes (i.e., MMX® opcodes). The same addressing mode information (e.g., addressing mode information of the MODR/M byte and/or the SIB byte) can be used in the legacy instructions and the MMX® instructions, but MMX® opcodes indicate that an addressed logical register of an MMX® instruction is a logical MMX® register. Legacy opcodes (e.g., opcodes defined prior to the addition of the MMX® opcodes of the MMX® instructions), however, cannot access the logical MMX® technology registers. Another known revision to the IA-32 architecture included the addition of eight 128-bit logical SIMD (Single Instruction Multiple Data) floating-point registers. The eight logical SIMD floating-point registers can be accessed by instructions that use the MODR/M byte and SIB byte formats and are preceded by a prefix byte (e.g., an OFH byte ("OFH" encompasses a hexadecimal value of OF), etc.). The eight logical SIMD floating-point registers cannot be accessed by an instruction unless the instruction is preceded by a prefix.

Figure 3:
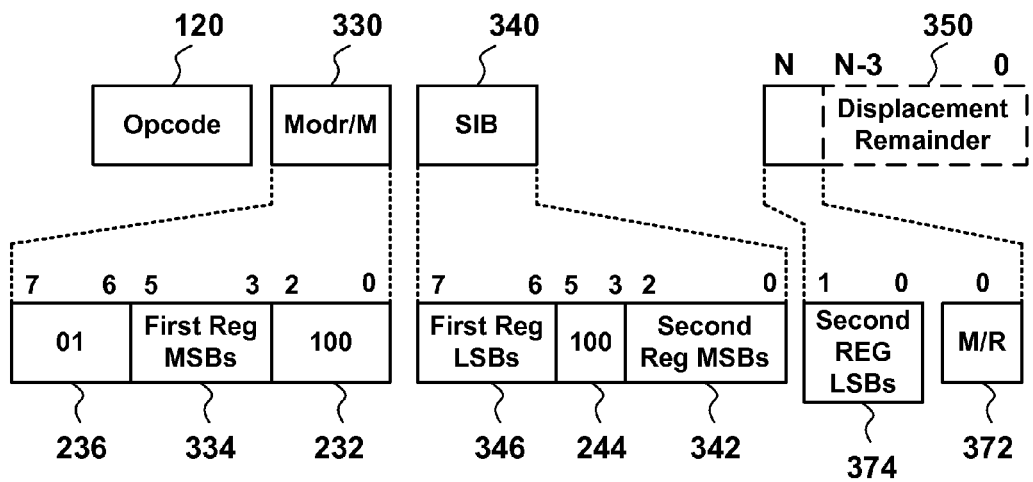
FIG. 3 shows an example of an instruction form in accordance with an embodiment of the present invention.

FIG. 3 shows an example of an instruction format in accordance with an embodiment of the present invention. An expanded set of registers can be accessed by an instruction without defining additional opcodes or requiring that the instruction be preceded by a prefix. The expanded set of registers can be accessed by remapping the bit information of the addressing mode information of instructions having certain encodings of addressing mode information to include register identifiers having at least four bits. Instruction 300, in one embodiment, includes a mod field 236 of 01B, an R/M field 232 of 100B, and an index field 244 of 100B. When an instruction decoder (e.g., an instruction decoder of a processor, an instruction decoder stage of a pipelined processor, etc.) recognizes an instruction having such addressing mode information, (e.g., the decoder includes comparator logic to identify such addressing mode information) the decoder can interpret bits of the addressing mode information and/or other instruction fields as specifying an expanded set of logical registers. In one embodiment, an expanded logical register set including thirty-two logical general integer registers can be addressed, e.g., the thirty-two registers being addressed by five bits. In another embodiment, an expanded logical register set including sixteen general logical integer registers can be addressed, e.g., the sixteen registers being address by four bits.

Instruction 300, in one embodiment, can specify a first register out of a thirty-two register set and a second register out of the thirty-two register set. Five bits of the addressing mode information of instruction 300 can specify the number of the first register. Bits 3-5 of ModR/M byte 330 can specify the first register number MSBs 334 (i.e., the three most significant bits of the number (e.g., 0 to 31) of the specified first register), and bits 6-7 of SIB byte 340 can specify the first register number LSBs 346 (i.e., the two least significant bits of the number of the specified first register). In known instructions, bits 6-7 of SIB byte 340 can specify a scale factor (e.g., scale field 146 of FIG. 1), but not scale factor is defined in the IA-32 architecture when an instruction (e.g., instruction 200 of FIG. 2) includes a mod field 236 of 01B, and R/M field 232 of 100B, and an index field of 100B. Accordingly, bits 6-7 of SIB byte 340 can be used to specify registers of an expanded logical register set.

In one embodiment, five bits of the addressing mode information and the displacement 350 of instruction 300 can specify the number of a second register. Bits 0-2 of SIB byte 340 can specify the second register number MSBs 342, and two bits of the displacement 350 can specify the second register number LSBs 374. In another embodiment of the present invention, the bits to specify the MSBs and the LSBs of the first register number and the second register number can be varied (e.g., bits 3-5 of the ModR/M byte 330 can store the least significant bits of the number of the first register, two bits of the displacement 350 can specify the most significant bits of the number of the first register, etc.).

The first register, in one embodiment, can be a source register, and the second register can be a destination register. In another embodiment, the original eight registers can be mapped onto the bottom of the expanded register set (e.g., be mapped as the first eight registers of an expanded sixteen register set, be mapped as the first eight registers of an expanded thirty-two register set, etc.). In a further embodiment, the original eight registers can be mapped onto the top of the expanded register set, throughout the expanded register set, etc.

In one embodiment, a one-bit m/r field 372 of displacement 350 can specify whether an instruction includes a register-memory operation or a register-register operation. When a register-memory operation is specified, a destination register and a displacement can become the address for a store or load operation. In such an embodiment, this would provide for a register +5 bit addressing mode, with the 5 bits being specified in the 5-bit displacement remainder portion of displacement 350. In one embodiment, the register +5 bit addressing mode can be byte aligned. In other embodiments, the register +5 bit addressing mode can be word aligned, double-word aligned (e.g., for a 64 bit register, etc.), quad-word aligned (e.g., for a 128-bit register, etc.), etc.

Figure 4:
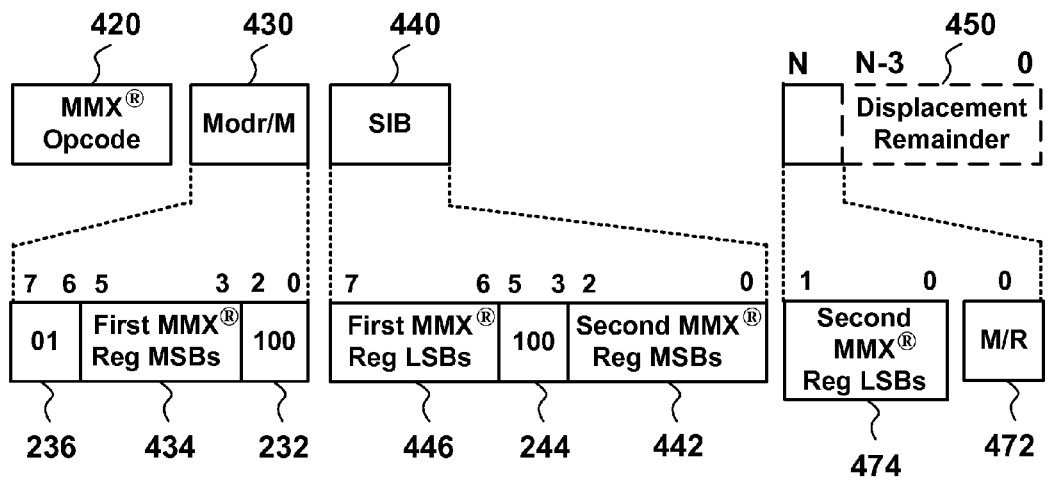
FIG. 4 shows an example of an instruction form in accordance with an embodiment of the present invention.

FIG. 4 shows an apparatus in accordance with an embodiment of the present invention. An expanded set of 64-bit MMX® technology registers can be accessed by an MMX® instruction without defining additional opcodes or requiring that the MMX® instruction be preceded by a prefix. The expanded set of MMX® technology registers can be accessed by remapping the bit information of the addressing mode information of MMX® instructions having certain encodings of addressing mode information. An expanded set of MMX® technology registers can be accessed by a MMX® instruction without defining additional MMX® opcodes or requiring that the MMX® instruction be preceded by a prefix. The expanded set of MMX® technology registers can be accessed by remapping the bit information of the addressing mode information of MMX® instructions having certain encodings of addressing mode information.

MMX® instruction 400, in one embodiment, includes an MMX® opcode 420, a ModR/M byte 430 that has a mod field 236 of 01B and an R/M field 232 of 100B, and a SIB byte 440 that has an index field 244 of 100B. When an instruction decoder (e.g., an instruction decoder of a processor, an instruction decoder stage of a pipelined processor, etc.) recognizes an MMX® instruction having such addressing mode information, the decoder can interpret bits of the addressing mode information and/or other instruction fields as specifying an expanded set of MMX® technology registers. In one embodiment, an expanded register set including thirty-two MMX® technology registers can be addressed, e.g., the thirty-two MMX® technology registers being addressed by five bits. In another embodiment, an expanded register set including sixteen MMX® technology registers can be addressed, e.g., the sixteen MMX® technology registers being address by four bits.

MMX® instruction 400, in one embodiment, can specify a first MMX® technology register out of a thirty-two MMX® technology register set and a second MMX® technology register out of the thirty-two MMX® technology register set. Five bits of the addressing mode information of instruction 400 can specify the number of the first MMX® technology register. Bits 3-5 of ModR/M byte 430 can specify the first MMX® register number MSBs 434 (i.e., the three most significant bits of the number (e.g., 0 to 31) of the specified first MMX® technology register), and bits 6-7 of SIB byte 440 can specify the first MMX® register number LSBs 446 (i.e., the two least significant bits of the number of the specified first MMX® technology register). In one embodiment, five bits of the addressing mode information and the displacement 450 of MMX® instruction 400 can specify the number of a second MMX® technology register. Bits 0-2 of SIB byte 440 can specify the second MMX® register number MSBs 442, and two bits of the displacement 450 can specify the second MMX® register number LSBs 474. In another embodiment of the present invention, the bits to specify the MSBs and the LSBs of the first MMX® technology register number and the second MMX® technology register number can be varied (e.g., bits 3-5 of the ModR/M byte 430 can store the least significant bits of the number of the second MMX® technology register, two bits of the displacement 450 can specify the most significant bits of the number of the second MMX® technology register, etc.).

In one embodiment, a one-bit m/r field 472 of displacement 450 can specify whether an MMX® instruction includes a register-memory operation or a register-register operation. When a register-memory operation is specified, a destination register and a displacement can become the address for a store or load operation. In such an embodiment, this would provide for a register +5 bit addressing mode, with the 5 bits being specified in the 5-bit displacement remainder portion of displacement 450.

Figures 5, 6:
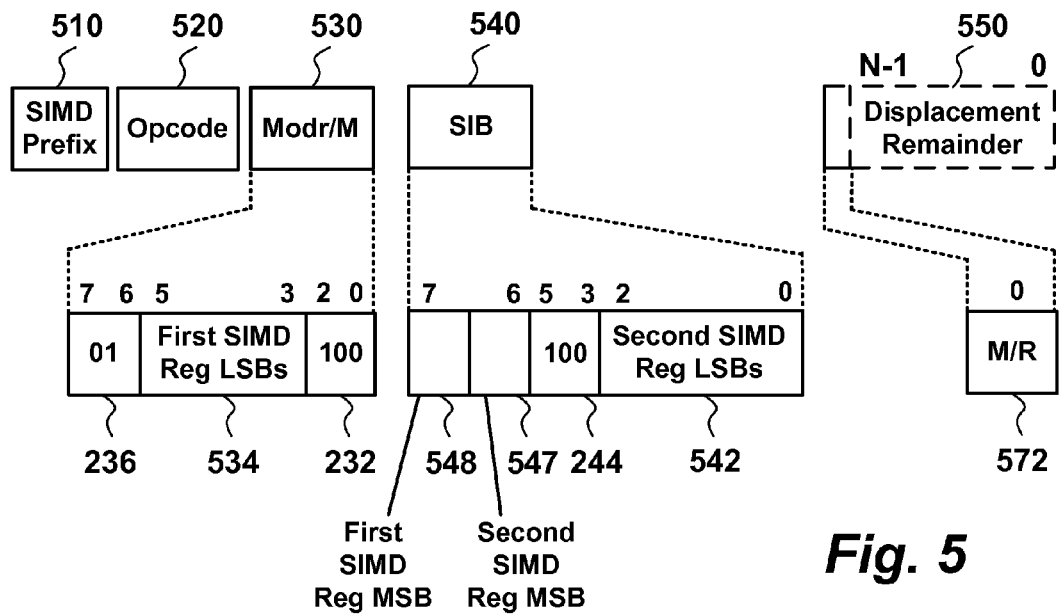
FIG. 5 shows an example of an instruction form in accordance with an embodiment of the present invention.
FIG. 6 shows data in accordance with embodiments of the present invention.

FIG. 5 shows an example of an instruction format in accordance with an embodiment of the present invention. An expanded set of 128-bit SIMD floating-point registers can be accessed by an instruction without defining additional opcodes or requiring that the SIMD instruction (i.e., an instruction preceded by a SIMD-specific prefix) be preceded by an additional prefix. The expanded set of SIMD floating-point registers can be accessed by remapping the bit information of the addressing mode information of SIMD instructions having certain encodings of addressing mode information.

SIMD instruction 500, in one embodiment, includes a SIMD prefix 510, an opcode 520 (e.g., a legacy opcode, an MMX® opcode, etc.), a ModR/M byte 530 that has a mod field 236 of 01B and an R/M field 232 of 100B, and a SIB byte 540 that has an index field 244 of 100B. When an instruction decoder (e.g., an instruction decoder of a processor, an instruction decoder stage of a pipelined processor, etc.) recognizes a SIMD instruction having such addressing mode information, the decoder can interpret bits of the addressing mode information and/or other instruction fields as specifying an expanded set of SIMD floating-point registers. In one embodiment, an expanded register set including thirty-two SIMD floating-point registers can be addressed, e.g., the thirty-two SIMD floating-point registers being addressed by five bits. In another embodiment, an expanded register set including sixteen SIMD floating-point registers can be addressed, e.g., the sixteen SIMD floating-point registers being address by four bits.

SIMD instruction 500, in one embodiment, can specify a first register out of a sixteen register set and a second register out of the sixteen register set. Four bits of the addressing mode information of SIMD instruction 500 can specify the number of the first register. Bits 3-5 of ModR/M byte 530 can specify the first SIMD register number LSBs 534 (i.e., the three least significant bits of the number (e.g., 0 to 15) of the specified first register), and bit 7 of SIB byte 540 can specify the first SIMD register number MSB 548 (i.e., the most significant bit of the number of the specified first SIMD register). In one embodiment, four bits of the addressing mode information of instruction 500 can specify the number of a second SIMD register. Bits 0-2 of SIB byte 540 can specify the second SIMD register number LSB 542, and bit 6 of SIB byte 540 can specify the second SIMD register number MSB 547 (i.e., the most significant bit of the number of the specified second SIMD register). In another embodiment of the present invention, the bits to specify the MSBs and the LSBs of the first SIMD register number and the second SIMD register number can be varied (e.g., bits 3-5 of the ModR/M byte 530 can store the most significant bits of the number of the first SIMD register, bits 0-2 of the SIB byte 540 can store the most significant bits of the number of the second SIMD register, etc.).

In one embodiment, a one-bit m/r field 572 of displacement 550 can specify whether a SIMD instruction includes a register-memory operation or a register-register operation. When a register-memory operation is specified, a destination register and a displacement can become the address for a store or load operation. In such an embodiment, this can provide for a register +7 bit addressing mode, with the 7 bits being specified in a 7-bit displacement remainder portion of displacement 550.

FIG. 6 shows data in accordance with embodiments of the present invention. Instructions in accordance with embodiment of the present invention have been described as including addressing mode information including a ModR/M byte that has a mod field of 01B and an R/M field of 100B, and a SIB byte that has an index field of 100B (Row 610). In such instructions, bits 6-7 of the SIB byte can specify register number information relating to an expanded set of logical registers (e.g., logical general integer registers, logical MMX® technology registers, logical SIMD floating-point registers, etc.) but no scale factor is defined in the IA-32 architecture when an instruction (e.g., instruction 200 of FIG. 2) includes a mod field of 01B, an R/M field of 100B, and an index field of 100B (Row 610). Thus, bits 6-7 of SIB byte can be used to specify registers of an expanded logical register set.

Embodiments of the present invention include instructions having addressing mode information including a ModR/M byte that has a mod field of 00B and an R/M field of 100B, and a SIB byte that has an index field of 100B. In an embodiment of the present invention in which the mod field is 00B, there can be an irregular addition of a 32-bit displacement. Other embodiments of the present invention include instructions having addressing mode information including a ModR/M byte that has a mod field of 10B and an R/M field of 100B, and a SIB byte that has an index field of 100B (Row 620) or instructions having addressing mode information including a ModR/M byte that has a mod field of 00B and an R/M field of 100B, and a SIB byte that has an index field of 100B (Row 630). In an embodiment of the present invention in which the mod field is 10B, the instruction typically can be large due to the presence of a 32-bit displacement. In such embodiments (e.g., where the mod field is 00B, 10B), bits 6-7 of the SIB byte can specify register number information relating to an expanded set of logical registers (e.g., general integer registers, MMX® technology registers, SIMD floating-point instruction registers, etc.) but no scale factor is defined in the IA-32 architecture for such instructions.

Figure 7:
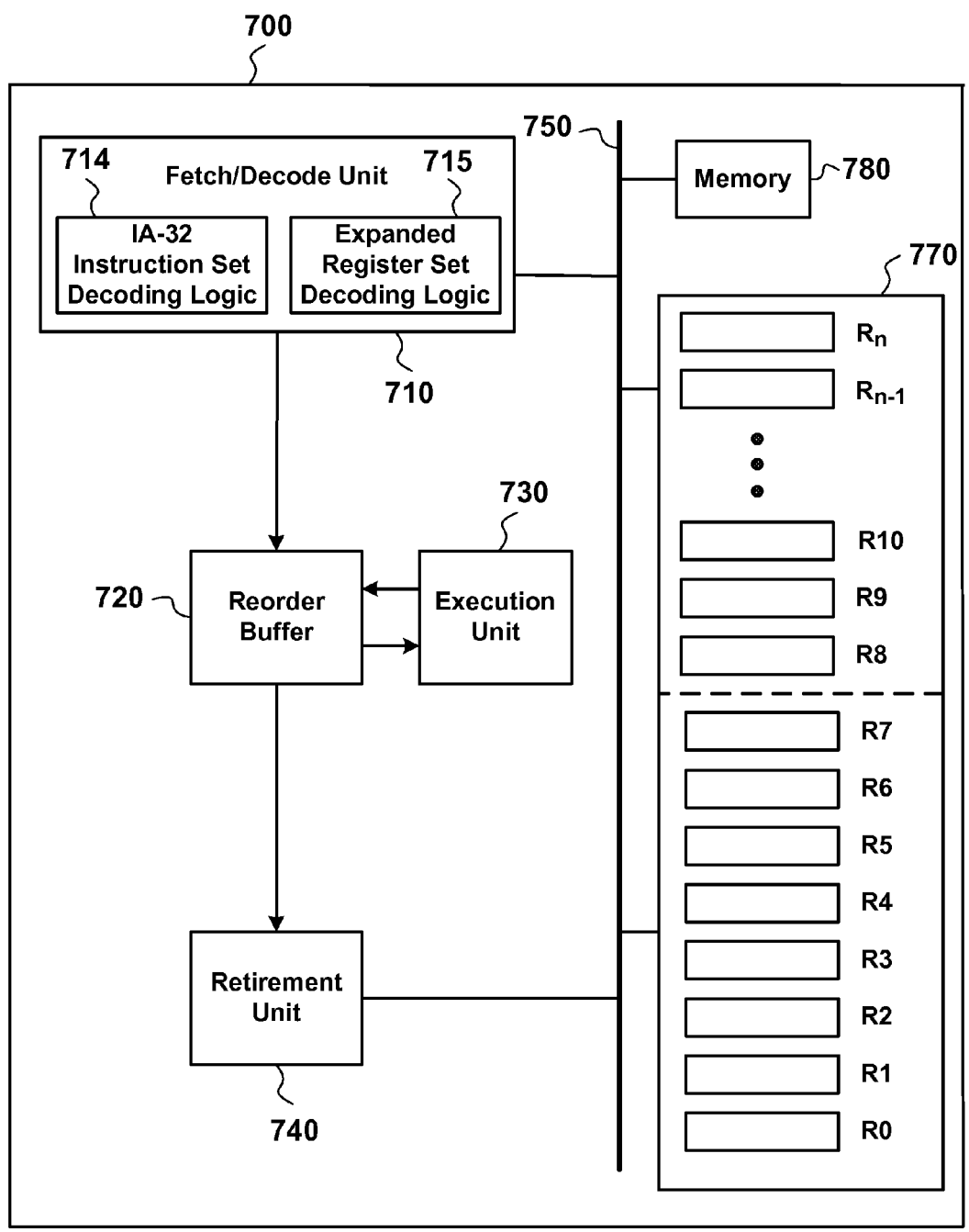
FIG. 7 shows an apparatus in accordance with an embodiment of the present invention.

FIG. 7 shows an apparatus in accordance with an embodiment of the present invention. In an embodiment of the present invention, a processor 700 includes a fetch/decode unit 710, a reorder buffer 720, an execution unit 730, and a retirement unit 740. In one embodiment of the present invention, processor 700 is a processor that can execute at least certain instructions of an IA-32 instruction set. In another embodiment of the present invention, processor 700 is an IA-32 architecture processor. In a further embodiment of the present invention, processor 700 is an IA-64 architecture processor that can execute at least certain instructions of the IA-32 instruction set. Fetch/decode unit 710, in one embodiment, is coupled to memory 780 via internal bus 750. The term "coupled" encompasses in indirect connection, a direct connection, etc. Fetch/decode unit 710 can read a stream of IA-32 instructions from memory 780 and decode them into a series of micro-operations ("micro-ops"). Memory 780 can comprise a cache memory, an L1 (level one) instruction cache, an instruction buffer, etc. The micro-ops can be sent to the reorder buffer 720.

In one embodiment, reorder buffer 720 can include an array of content-addressable memory arranged in micro-op registers. The reorder buffer 720 can hold micro-ops that are waiting to be executed, and micro-ops that have already been executed. The execution unit 730 can execute the instructions from the reorder buffer in any order, such as after micro-ops are ready to be executed (e.g., when all the source operands are available). After a micro-op is executed, the results of the micro-op can be sent to the reorder buffer and stored along with micro-op until the micro-op is retired. Retirement unit 740 can write the results of an executed micro-op to a register retirement file and/or memory, and can remove the executed micro-op from the reorder buffer 720.

In accordance with an embodiment of the present invention, processor 700 includes an expanded logical register set. An IA-32 processor can include a standard register set including eight logical registers. A logical register encompasses registers that are user addressable, software addressable, visible to a compiler, etc. A physical register is typically not user addressable, not software addressable, not visible to a compiler, etc. Each of the eight logical registers of a standard register set can be specified by three bits of addressing mode information of an IA-32 instruction. Examples of the eight logical registers include eight logical general integer registers, eight logical MMX® technology registers, eight logical SIMD floating-point registers, etc. Embodiments of the present invention include an expanded logical register set 770 having N logical registers, where N can be sixteen, thirty-two, sixty-four, etc. In an embodiment including an expanded register set of sixteen logical registers, the sixteen logical registers of the expanded logical register set can be specified by four bits of addressing mode information of an IA-32 instruction. In an embodiment including an expanded logical register set of thirty-two logical registers, each of the thirty-two logical registers of the expanded logical register set can be specified by five bits, e.g., five bits of addressing mode information of an instruction, five bits from the addressing mode information and/or other fields (e.g., the displacement, the immediate operand, etc.) of the instruction. In accordance with an embodiment of the present invention, a portion of fetch/decode unit 710 that deals with instruction length requires no changes to support the expanded logical register set. The length of a legacy instruction need not be modified, and an expanded logical register set can be addressed.

In one embodiment, expanded logical register set 770 includes standard IA-32 logical registers $R_0$-$R_7$ and expanded logical registers $R_8$-$R_N$, where $R_N$ can be $R_{16}$, $R_{32}$, $R_{64}$, etc. Standard IA-32 logical register $R_0$-$R_7$, in one embodiment, can be standard IA-32 logical general integer registers EAX, EBX, ECX, EDX, ESP, EBP, ESI, and EDI, and expanded logical registers $R_8$-$R_N$ can be additional 32-bit logical general integer registers. In another embodiment, standard IA-32 logical registers $R_0$-$R_7$ can be 64-bit logical MMX® technology registers MM0-MM7, and expanded logical registers $R_8$-$R_N$ can be additional 64-bit logical MMX® technology registers. In a further embodiment, standard IA-32 logical registers $R_0$-$R_7$ can be 128-bit logical SIMD floating-point registers XMM0-XMM7, and expanded logical registers $R_8$-$R_N$ can be additional 128-bit logical SIMD floating point registers. In one embodiment of the present invention, the standard IA-32 logical general integer registers are a first type of logical registers, the 64-bit logical MMX® technology registers are a second type of logical registers, and the 128-bit logical SIMD floating point registers are a third type of logical registers.

In an embodiment of the present invention, fetch/decode unit 710 includes IA32 instruction set decoding logic 714 to decode IA-32 instructions. Fetch/decode unit 710 can include expanded register set decoding logic 715 that can recognize instructions that access the expanded register set (e.g., an instruction including addressing mode information including a SIB byte that has an index field of 100B and ModR/M byte that has an R/M field of 100B and a mod field of 01B, 00B, or 10B. When the expanded register set decoding logic 715 recognizes such an instruction, the instruction is decoded in accordance with embodiments of the present invention to access the expanded register set. In embodiments of the present invention including register renaming logic and a physical register file, each can be modified to support the expanded logical register set.

In accordance with an embodiment of the present invention, software can include instructions compiled to utilize the expanded set of logical registers. The software can include instructions to determine whether a processor executing the software supports an expanded logical register set in accordance with an embodiment of the present invention. In one embodiment, a processor includes a CPUID (central processing unit identification) (e.g., a register, etc.) having a bit that indicates whether the processor includes an expanded set of logical registers and logic to decode instructions accessing the expanded logical register set.

Methods and apparatus in accordance with embodiments of the present invention can advantageously access an expanded logical register set. The expanded logical register set can be accessed by instructions including legacy opcodes and remapped addressing mode information. Whereas the known IA-32 instruction set is limited to accessing eight logical general integer registers, embodiments of the present invention include an expanded logical register set (e.g., sixteen registers, thirty-two registers, sixty-four registers, etc.) that can be accessed by remapped addressing mode information without defining new opcodes or defining additional instruction prefixes. An expanded register set can allow greater optimization of software and reduce the number of accesses to memory and/or stack, thereby increasing system performance. Embodiments of the present invention can allow current IA-32 opcodes (e.g., legacy opcodes, MMX® opcodes, opcodes preceded by a SIMD prefix, etc.) to access an expanded register set.

Embodiments of methods and apparatus to access an expanded register set have been described. In the foregoing description, for purposes of explanation, numerous specific details are set forth to provide a thorough understanding of the present invention. It will be appreciated, however, by one skilled in the art that the present invention may be practiced without these specific details. In other instances, structures and devices are shown in block diagram form. Furthermore, one skilled in the art can readily appreciate that the specific sequences in which methods are presented and performed are illustrative and it is contemplated that the sequences can be varied and still remain within the spirit and scope of the present invention.

In the foregoing detailed description, apparatus and methods in accordance with embodiments of the present invention have been described with reference to specific exemplary embodiments. Accordingly, the present specification and figures are to be regarded as illustrative rather than restrictive.

We claim:

1. A system comprising:
a memory to store 32-bit architecture instructions;
an expanded logical register set including more than eight logical registers of a first type;
a bus coupled to said memory; and
32-bit architecture instruction set decoding logic coupled to the expanded logical register set and the memory via the bus,
wherein the 32-bit architecture instruction set decoding logic is to determine whether a mod field of a ModR/M byte of a 32-bit architecture instruction contains a value selected from the values of 01B, 10B, and 00B, to determine whether an r/m field of the ModR/M byte of the 32-bit architecture instruction contains a value of 100B, to determine whether an index field of a scale index base (SIB) byte contains a value of 100B, and to decode an expanded logical register identifier.

2. The system of claim 1, wherein said expanded logical register set includes up to sixteen logical registers of a first type.

3. The system of claim 1, wherein said expanded logical register set includes up to thirty-two logical registers of a first type.

4. The system of claim 1, wherein the more than eight logical registers of a first type include more than eight logical general integer registers.

5. The system of claim 1, wherein the more than eight logical registers of a first type include more than eight logical multimedia extension technology registers.

6. The system of claim 1, wherein the more than eight logical registers of a first type include more than eight logical single instruction multiple data (SIMD) floating-point registers.

7. The system of claim 1, further comprising:
expanded register set decoding logic, coupled to said 32-bit architecture instruction set decoding logic, to determine whether an instruction includes an at least four-bit register identifier, the at least four-bit register identifier to specify one logical register of said expanded logical register set.

8. The system of claim 7, wherein said expanded register set decoding logic is to decode an at least four-bit identifier.

9. The system of claim 8, wherein said expanded register set decoding logic is to decode the at least four-bit register based at least in part on at least four bits of a scale index base (SIB) byte of the instruction.

10. The system of claim 9, wherein said expanded register set decoding logic is to decode the at least four-bit register based at least in part on at least one bit of a scale field of the scale index base (SIB) byte of the instruction.

11. The system of claim 7, wherein said expanded register set decoding logic is to decode an at least five-bit register identifier.

12. The system of claim 11, said expanded register set decoding logic is to decode the at least five-bit register based at least in part on five bits of a scale index base (SIB) byte of the instruction.

13. The system of claim 12, wherein said expanded register set decoding logic is to decode the at least five-bit register based at least in part on two bits of a scale field of the scale index base (SIB) byte of the instruction.

14. A set of instructions residing in a computer readable storage medium, said set of instructions capable of being executed by a storage controller to implement a method for processing data, the method comprising:
determining that a mod field of a ModR/M byte of a 32-bit architecture instruction contains a value selected from the values of 01B, 10B and 00B;
determining that an r/m field of the ModR/M byte of the 32-bit architecture instruction contains a value of 100B;
determining that an index field of a scale index base (SIB) byte contains a value of 100B;
decoding an at least four-bit logical register identifier in response to said values being contained in said mod field, said r/m field, and said index field; and
retrieving a value from a register corresponding to said at least four-bit logical register identifier.

15. The set of instructions of claim 14, wherein decoding the at least four-bit logical register identifier is based at least in part on at least one bit of a scale field of a scale index base (SIB) byte of the 32-bit architecture instruction.

16. The set of instructions of claim 14, wherein the at least four-bit logical register identifier is an at least five-bit logical register identifier.

17. The set of instructions of claim 16, wherein decoding an at least five-bit logical register identifier is based at least in part on two bits of a scale field of a scale index base (SIB) byte of the 32-bit architecture instruction.

18. A processor comprising:

a logical register set including more than eight logical registers of a first type;

instruction decoding logic coupled to the logical register set, said instruction decoding logic including:

a first comparator to determine whether a mod field of a ModR/M byte of a 32-bit architecture instruction contains a value selected from the values of 01B, 10B, and 00B;

a second comparator to determine whether an r/m field of the ModR/M byte of the 32-bit architecture instruction contains a value of 100B;

a third comparator to determine whether an index field of a scale index base (SIB) byte contains a value of 100B; and an instruction decoder to identify a register of said logical register set based on said values of said mod field, said r/m field and said index field.

19. The processor of claim 18, wherein said instruction decoder is to decode an at least four-bit logical register identifier based at least in part on at least one bit of a scale field of a scale index base (SIB) byte of the 32-bit architecture instruction.

* * * * *